United States Patent [19]

Dahmen et al.

[11] Patent Number: 5,575,939
[45] Date of Patent: Nov. 19, 1996

[54] PROCESS FOR SOFTENING/STUFFING LEATHER AND FUR SKINS

[75] Inventors: Kurt Dahmen, Monchengladbach; Richard Mertens, Krefeld; Thomas Muller, Dusseldorf; Helmut Lohmann, Krefeld, all of Germany

[73] Assignee: Chemische Fabrik Stockhausen GmbH, Krefeld, Germany

[21] Appl. No.: 325,184

[22] PCT Filed: Oct. 19, 1993

[86] PCT No.: PCT/EP93/02880

§ 371 Date: Jun. 9, 1995

§ 102(e) Date: Jun. 9, 1995

[87] PCT Pub. No.: WO94/10346

PCT Pub. Date: May 11, 1994

[30] Foreign Application Priority Data

Oct. 29, 1992 [DE] Germany .......................... 42 36 556.2

[51] Int. Cl.⁶ .............................. C14C 9/00; C14C 11/00
[52] U.S. Cl. .................... 252/8.57; 8/94.1 R; 8/94.14; 8/94.18; 8/94.21; 8/94.22
[58] Field of Search ..................... 252/8.57; 8/94.1 R, 8/94.14, 94.18, 94.21, 94.22

[56] References Cited

U.S. PATENT DOCUMENTS

| | | | |
|---|---|---|---|
| 3,721,654 | 3/1973 | Schlumbom et al. | 252/8.57 |
| 3,721,655 | 3/1973 | Schlumbom et al. | 252/8.57 |
| 4,931,197 | 6/1990 | Beck et al. | 252/56 R |
| 5,124,181 | 6/1992 | Schaffer et al. | 252/8.57 |
| 5,279,613 | 1/1994 | Schaffer et al. | 252/8.57 |
| 5,425,784 | 6/1995 | Denzinger et al. | 252/8.57 |
| 5,433,752 | 7/1995 | Birkhofer et al. | 252/8.57 |

FOREIGN PATENT DOCUMENTS

| | | | |
|---|---|---|---|
| 694539 | 11/1979 | U.S.S.R. | 252/8.57 |

*Primary Examiner*—Anthony Green
*Attorney, Agent, or Firm*—Oblon, Spivak, McClelland, Maier & Neustadt, P.C.

[57] ABSTRACT

The invention relates to a process for the fat liquoring/softening of leathers and furs by treatment with an aqueous dispersion of a copolymer obtainable by polymerization of a) maleic anhydride, b) $C_{12}$–$C_{30}$ alpha-olefins, esters of (meth)acrylic acid and/or maleic acid with $C_{12}$–$C_{30}$ alcohols and c) optionally, further hydrophilic, ethylenically unsaturated monomers which are copolymerizable with a) and b), reaction of the anhydride groups with monovalent alcohols comprising at least one ether functionality, and partial neutralization or hydrolysis of the residual acid or anhydride groups and manufacture of a flowable dispersion having an active substance content of at least 40%-wt.

13 Claims, No Drawings

PROCESS FOR SOFTENING/STUFFING LEATHER AND FUR SKINS

The present invention relates to a process for softening/fat liquoring and greasing leathers and fur skins with an aqueous dispersion of a copolymer obtainable by A) polymerizing
  a) 25 to 70%-wt. maleic anhydride
  b) 25 to 70%-wt. $C_{12}$–$C_{30}$ alpha-olefins, esters of (meth)acrylic acid and/or maleic acid with $C_{12}$–$C_{30}$ alcohols and
  c) 0 to 10%-wt. further hydrophilic, ethylenically unsaturated monomers which are copolymerizable with a) and b), with the proviso that a)+b)+c)=100, B) reacting the anhydride groups prior to, during or after the polymerization with monovalent alcohols comprising at least one ether functionality, whereby the molar ratio of anhydride to alcohol is of the order of 1:0.5 to 1:2, preferably 1:0.7 to 1:1.5 so that the amount of hydrophilic units of the resultant polymer body is larger than 50%-wt. and C) partially neutralizing or hydrolyzing the residual acid or anhydride groups in the polymer and manufacturing a flowable dispersion having an active substance content of at least 40%-wt., preferably at least 50%-wt.

In the leather industry, fat liquors and greases are frequently used to produce soft, supple leather types. For the most part, these are natural fats, oils and waxes which are partly rendered hydrophilic by a suitable chemical treatment, for example by sulfatation or sulfitation, so that they can be used in aqueous liquor on the one hand, and, on the other hand, an improved bond to the fibrous structure of the leather is achieved. The disadvantage of said fat liquors is the fact that they can be removed from the fibrous network by washing or, in particular, during usual dry cleaning with halogenated hydrocarbons, which leads to an embrittlement of the leather. A similar effect may occur when the fat liquors are removed from the leather by migration, in particular at elevated temperatures caused by intensive solar radiation. In the special case of seat covers in vehicles, this process results in the so-called "fogging"-behavior since the dissolved low-molecular constituents of the leather deposit as foggy, smeary films on the window panes.

To eliminate said disadvantages, the use of polymeric substances having softening properties has been recommended.

DE 2 629 748 claims the use of copolymers of monoolefins having 10 to 30 carbon atoms and maleic anhydride to fill and fat liquor leathers and fur skins. Soft and full leathers are obtained even without using additional fat liquors and greases. However, large amounts of difficultly degradable organic solvents, such as paraffin oils or xylenes, are necessary in the production of the copolymers; a fact that is not desired any longer from today's ecological point of view.

DE 3 926 167 A1 proposes the use of copolymers of long-chain monoolefins with ethylenically unsaturated dicarboxylic acid anhydrides to make leather and fur skins hydrophobic. The difference to DE 2 629 748 lies in the fact that a solvolysis of the anhydride groups of the polymer is carried out after the polymerization by means of alcohols or amines, whereby a maximum of 50 mole-% of the present anhydride groups shall be esterified or amidated in this manner. According to this application, alcohols having 1 to 40, preferably 3 to 30 carbon atoms are suitable for this purpose. There is no indication with respect to the use of alcohols having an additional ether function. Solid contents of 10 to 60%-wt., preferably 20 to 55%-wt. are claimed for the polymers obtained by mass polymerization, however, in the examples a maximum solid content of only 30% is obtained.

For the same purpose, i.e., making leathers and furs hydrophobic, DE 39 31 039 A 1 proposes the use of copolymers comprising incorporated by polymerization a)i 50 to 90%-wt. $C_8$ to $C_{40}$-alkyl(meth)acrylates or vinyl esters of $C_8$ to $C_{40}$-carboxylic acids and b) 10 to 50%-wt. monoethylenically unsaturated $C_3$ to $C_{12}$-carboxylic acids, monoethylenically unsaturated dicarboxylic acid anhydrides, semiesters or semiamides of monoethylenically unsaturated $C_4$ to $C_{12}$-dicarboxylic acids, amides of $C_3$ to $C_{12}$-monocarboxylic acids or mixtures thereof. If maleic anhydride is used as monomer of group b), this is at least partially neutralized or solvolised in the above meaning after termination of the polymerization.

The preparation of the polymers is effected either by mass polymerization at temperatures above 200° C. or as precipitation or solvent polymerization under addition of organic solvents which have to be removed by distillation after completion of the polymerization. In both cases the production requires a high expenditure of energy, this is disadvantageous from the economic and ecological point of view.

Finally, EP 372 746 A2 describes the treatment of leathers with amphiphilic copolymers the major part of which consists of hydrophobic monomers and the minor part of hydrophilic monomers for the simultaneous retanning and fat liquoring of leathers. The required copolymers are preferably produced in solution in an alcohol miscible with water, the quantity of solvent amounting from 33 to 400%-wt., relative to the solid substance of the copolymer. Since the alcohol is not removed after termination of the polymerization in the embodiment examples, it pollutes the waste water which comes up during the treatment in the tannery.

For this reason, the object was to find suitable systems for the treatment of leathers and fur skins providing a good leather quality without the addition of fat liquors and eliminating the above mentioned disadvantages.

This object has surprisingly been achieved by treating chrometanned leathers and furs with an aqueous dispersion of at least one copolymer obtainable by A) polymerizing
  a) 25 to 70%-wt. maleic anhydride,
  b) 25 to 70%-wt. $C_{12}$–$C_{30}$ alpha-olefins or ester of the (meth)acrylic acid and/or the maleic acid with $C_{12}$–$C_{30}$ alcohols and
  c) 0 to 10%-wt. further hydrophilic, ethylenically unsaturated rated monomers copolymerizable with a) and b), with the
  proviso that a) +b) +c) =100, B) reacting the anhydride groups prior to, during or after the polymerization with monovalent alcohols comprising at least one ether functionality, whereby the molar ratio of anhydride to alcohol amounts to about 1:0.5 to 1:2, preferably 1:0.7 to 1:1.5 so that the amount of hydrophilic units of the resulting polymer body is larger than 50%-wt. and C) partially neutralizing or hydrolyzing the residual acid or anhydride groups in the polymer and producing a flowable dispersion with an active substance content of at least 40%-wt., preferably at least 50%-wt.

Most surprisingly, the use of the polymer dispersions according to the present invention provides excellent leather qualities with respect to softness, fullness, grain pattern and leather color.

The polymers employed are known in principle. DE 31 36 931 C2 describes copolymers of this type for the use as lubricants in the production of PVC. However, there is no indication as to the application of said agents in the production of leather.

The production of the polymer dispersions according to the present invention is preferably carried out by radical mass polymerization of the monomers from groups a), b) and c) at temperatures of 20 to 200° C., however, it may also be carried out as emulsion or solution polymerization.

The reaction may be started by redox catalysis, thermal or photochemical initiation by means of known initiator systems; peroxo and/or azo compounds soluble in the monomer mixture are particularly suitable.

The monomers of group b) are chosen from the substance classes of the long-chain alpha-olefins having 12 to 30 carbon atoms, the (meth)acrylic acid esters of alcohols having 12 to 30 carbon atoms and/or the maleic acid semiesters of alcohols having 12 to 30 carbon atoms.

Examples of the first familiy include: 1-dodecene, 1-tridecene, 1-tetradecene, 1-pentadecene, 1-hexadecene, 1-heptadecene, 1-octadecene, 1-nonadecene, 1-eicosene, 1-duoeicosene, 1-tetraeicosene, 1-hexaeicosene or technical mixtures of said monomers. 1-hexadecene and 1-octadecene are preferred from this group. The listed monomers are commercial products.

Representatives of the second class-include: dodecyl-(meth)acrylate, tetradecyl(meth)acrylate, hexadecyl-(meth)acrylate, octadecyl(meth)acrylate, eicosyl(meth)acrylate, duoeicosyl(meth)acrylate, tetraeicosyl(meth)acrylate, hexaeicosyl(meth)acrylate or mixtures of these substances. These monomers are easily available by reacting the corresponding alcohols with (meth)acrylic acid or reactive derivatives thereof, e.g., the acid halides, the acid anhydrides or the low-molecular acid esters. For synthesis purposes it is preferred to use commercially available fatty alcohols or fatty alcohol mixtures, e.g., stearyl alcohol, coconut or tallow fatty alcohol or technical alcohol mixtures, for example manufactured by the "build-up"-reaction (tradename Alfole). The methods of producing this monomer class are known to those skilled in the art.

Finally, the third class may be obtained by reaction of the above alcohols or alcohol mixtures with maleic acid or reactive derivatives thereof, maleic anhydride being preferred.

It is preferred to manufacture the ester-groups-containing monomers prior to the actual polymerization, however, they may also be produced in the course thereof. It is also possible, to bind the long-chain alcohols to the polymer body after polymerization by means of reactive acid derivatives which are incorporated therein by polymerization.

Any water soluble monomer copolymerizable with a) and b) may be used as monomers of group c), for example, ethylenically unsaturated acids, the salts, amides, nitriles and/or esters thereof. Representatives of this class include: (meth)acrylic acid, (meth)allyl sulfonic acid, 2-acrylamido-2-methylpropane sulfonic acid, vinylsulfonic acid, styrylsulfonic acid, (meth)acrylamide, dimethylaminopropyl (meth)acrylamide, (meth)acrylonitrile, (meth)acrylic acid methylester, hydroxyethyl (meth)acrylate, vinyl acetate and N-vinyl pyrrolidone. From this group acrylic acid is preferred.

The numerical mean of the molar mass of the obtained polymers is between 500 and 50,000 g/mol. The molar mass may for example be determined by gel permeation chromatography wherein tetrahydrofuran is used as solvent and closely distributed polyethylene glycol standards are used to gauge.

The molar mass can be controlled by the amount of initiator, the monomer concentration, the choice of polymerization temperature or by the use of chain transfer agents known per se, e.g., mercaptans.

According to the present invention, the reaction of the anhydride groups with monovalent alcohols having at least one ether functionality is preferably carried out during or after the actual polymerization, however, it may also be effected prior to polymerization. In this way, the copolymerization behavior and with that the product properties may be controlled deliberately.

Suitable alcohols of the invention are water soluble, monofunctional compounds of the general formula I:

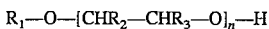

with $R_1=C_1$ to $C_6$-alkyl, $R_2$, $R_3$=H, $CH_3$, n=1–10, preferably 1–4.

Examples of suitable alcohols include: ethylene glycol monomethyl ether, ethylene glycol monoethyl ether, ethylene glycol monopropyl ether, ethylene glycol monobutyl ether, ethylene glycol monohexyl ether, diethylene glycol monomethyl ether, diethylene glycol monoethyl ether, diethylene glycol monopropyl ether, diethylene glycol monobutyl ether, diethylene glycol monohexyl ether, triethylene glycol monomethyl ether, triethylene glycol monoethyl ether, triethylene glycol monobutyl ether, tetraethylene glycol monoethyl ether, tetraethylene glycol monobutyl ether.

Ethylene glycol monobutyl ether (butyl glycol) and diethylene glycol monobutyl ether (butyl diglycol) are preferably used from this group.

When the reaction is terminated, the polymers are partially neutralized by the addition of bases and, optionally, water and brought into the condition of an aqueous solution or dispersion. The amount of base is chosen such that the pH value of the obtained solution or dispersion adjusts to between 5 and 9.

Suitable neutralizers are alkali hydroxides, alkaline-earth metal hydroxides, ammonia, amines, polyamines or aminoalcohols.

The aqueous solutions or dispersions according to the present invention which are flowable at room temperature have an active substance content of at least 40%-wt., preferably at least 50%-wt.

The treatment of the tanned hides with the copolymers according to the invention is carried out in aqueous liquor obtainable by diluting or dispersing the described products with water. The required quantity of copolymer solid may amount to 1 to 30%-wt., relative to the shaved weight of the leather. It is preferred to use quantities of 3 to 25% by weight; 5 to 10%-wt. being sufficient to obtain good leather properties in most cases. The float ratio amounts to 50 to 1,000%-wt., preferably 80 to 500% by weight. The treatment is carried out at a pH value of the float of 3.5 to 7 and at a temperature of 20 to 60° C. within a period of 5 to 180 minutes, preferably 20 to 60 minutes. For instance, it may be effected by milling in a drum. The treatment may be carried out using the products of the invention alone or in combination with known fat liquors and greases and/or dyeing agents.

The present invention will be illustrated in more detail by the following embodiment examples.

Manufacture of the Copolymers

EXAMPLE 1

180.0 g 1-octadecene and 120.0 g butyl glycol are placed in an apparatus consisting of a plane-ground-flask with mechanical stirrer, reflux condenser, metering units and internal thermometer and heated to an internal temperature of 130° C. At this temperature, a mixture of 30.0 g acrylic acid, 12.4 g di-tert.-butyl peroxide and 10.0 g dodecylmercaptan is added within 2 hours. At the same time, 90.0 g maleic anhydride is added to the reaction mixture in 8 equal portions. After completion of the addition, stirring is continued for one hour at 130° C. and neutralization and dispersion are effected at 90° C. with 70.8 g 45% sodium hydroxide solution and 404.4 g deionized water. A viscous dispersion which is flowable at 20° C. and has 50% active substance (AS) and a degree of neutralization (DN) of 61% is obtained. pH value (1:10):7.8 Viscosity (30° C., Brookfield RVM, sp. 6, 5 rpm): 87,000 mPas Numerical mean of molar mass (GPC): 1,700 g/mol

EXAMPLE 2

60.0 g 1-octadecene, 80.0 g of a reaction product of 49.0 g maleic anhydride with 129.0 g Alfol 1618 and 60.0 g butyl glycol are placed in the apparatus of Example 1 and heated to 130° C. On reaching the reaction temperature, the following are simultaneously added through different feed inlets within two hours: a mixture of 20.0 g acrylic acid with 8.2 g di-tert.-butyl peroxide, a solution of 6.0 g dodecylmercaptan in 20.0 g butyl glycol and 60.0 g maleic anhydride brought to a temperature of 75° C. After completion of the addition, stirring is continued for one hour at 130° C., finally neutralization and dispersion are effected with 53.0 g 45% sodium hydroxide solution and 290.5 g deionized water at 90° C. A viscous dispersion which is flowable at 20° C. is obtained, it has 50% active substance (AS) and a degree of neutralization (DN) of 60%. pH value (1:10):7.2 Numerical mean of molar mass (GPC): 1,650 g/mol

EXAMPLE 3

240.0 g 1-octadecene, 80.0 g maleic anhydride and 120.0 g butyl glycol are placed in the apparatus of Example 1 and stirred for one hour at 60° C. Then the reaction mixture is heated to 130° C. and a mixture of 40 g butyl glycol, 16 g di-tert.-butyl peroxide and 10 g dodecylmercaptan added dropwise within two hours. After dosing for one hour, 80.0 g maleic anhydride heated to 75° C. is added through a separate feed inlet within 50 minutes. The further procedure corresponds to that of Example 1. A highly viscous dispersion having 50% AS and 64% DN is obtained. pH-value (1:10):7.8 Viscosity (30° C., Brookfield RVM, sp. 7, 5 rpm): 376,000 mPas Numerical mean of molar mass (GPC): 1,700 g/mol

EXAMPLE 4

The same procedure as in Example 3 is used, however, only 60.0 g liquid maleic anhydride is added. Product data (50% AS; 64% DN): pH value (1:10):7.8 Viscosity (30° C., Brookfield RVM, sp. 7, 5 rpm): 133,000 mPas Numerical mean of molar mass (GPC): 1,900 g/mol

EXAMPLE 5

70.0 g 1-octadecene, 70.0 g of a reaction product of 35.3 g maleic anhydride with 87.3 g tallow fatty alcohol and 60.0 g butyl glycol are placed in the apparatus of Example 1 and heated to an internal temperature of 130° C. At this temperature, 20.0 g acrylic acid, 8.2 g di-tert-butyl peroxide, 6.0 g dodecylmercaptan, 20.0 g butyl glycol and 60.0 g liquid maleic anhydride are added simultaneously through different feed inlets within two hours. Stirring is effected for one further hour at 130 to 150° C., then the mixture is allowed to cool to 90° C. and neutralization is carried out with 54.0 g sodium hydroxide solution (50%) and 288.9 g deionized water. A finely divided dispersion having 50% AS and 64% DN is obtained. pH-value (1: 10):7.3 Numerical mean of molar mass (GPC): 1,300 g/mol

EXAMPLE 6

120.0 g 1-octadecene and 60.0 g triethylene glycol monoethyl ether are placed into the apparatus of Example 1 and heated to an internal temperature of 130° C. At this temperature, 20.0 g acrylic acid, 8.0 g di-tert.-butyl peroxide, 6.6 g mercaptoethanol, 15.0 g triethylene glycol monoethyl ether and 60.0 g liquid maleic anhydride are added simultaneously within two hours. Stirring is continued at 130 to 150° C. for one hour, followed by cooling to 90° C. and neutralization with 44.6 g sodium hydroxide solution (50%) and 427.9 g deionized water. A finely divided dispersion having 40% AS and 55% DN is obtained. pH value (1:10):7.4 Numerical mean of molar mass (GPC): 1,500 g/mol

EXAMPLE 7

240.0 g 1-octadecene and 150.0 g of a reaction product of 1 mole propylene glycol monobutyl ether with 9 moles ethylene oxide are placed in the apparatus described in Example 1 and heated to an internal temperature of 130° C. At this temperature, 40.0 g acrylic acid, 16.0 g di-tert.-butyl peroxide, 13.2 g mercaptoethanol, 10.0 g butyl glycol and 120.0 g liquid maleic anhydride are added simultaneously through different feed inlets within a period of two hours. Stirring is continued for one hour at 130 to 150° C., followed by cooling to 90° C. and neutralization with 71.2 g sodium hydroxide solution (50%) and 557.2 g deionized water. A finely divided dispersion having 50% AS and 50% DN is obtained. pH-value (1: 10):6.7 Viscosity (30° C., Brookfield RVM, sp. 6, 10 rpm): 3,200 mPas Numerical mean of molar mass (GPC): 1,600 g/mol

EXAMPLE 8–14

Application in Leather Technology

The treatment of the leathers with the copolymers according to the present invention was conducted according to the following procedure:

Leather: cattle hides, type: nappa leather, wet blue, shaved substance 1.0 to 1.2 mm, %-indications relative to the shaved weight.

| 1) Retanning | 200% water | 40° C. |
|---|---|---|
| | 4% retanning agent combination[1] | 60 min. |
| Drain off bath | | |
| 2) Neutralization | 200% water | 35° C. |
| | 2% sodium formate, 2% retanning agent[2] | 30 min. |
| | +1% sodium bicarbonate, 1:10 | 45 min. |
| pH of bath: 5.5 to 7.0 | | |
| Leather cross-section against Bromocresol green: blue | | |
| Drain off bath | | |
| 3) Rinsing | water 60° C. | 10 min. |
| 4) Fat-liquoring | 5–20% copolymer dispersions acc. to the invention, acc. to Examples 1–4, 1:4 | 45 min. |
| | +1% formic acid, 1:5 | 30 min. |
| Final pH of bath: 4.0 to 5.0 | | |
| Drain off bath | | |
| 5) Rinsing | water 20 C. | 5 min. |
| Leather: horse up overnight, samming, wet toggling, staking. milling, toggling. | | |

[1]Light-fast chromium-containing, neutralizing combination of tanning agent, manufacturer Bayer AG, tradenames: CHROMOSAL B and BLANCOROL RC
[2]Light-fast, anionic retanning agent having a strong neutralizing and buffering effect, manufacturer Bayer AG, tradename TANIGAN PC The leathers obtained were tested by grading the softness, tightness of grain and color of the leather. If the polymer dispersions of Examples 1 to 4 are used, soft leathers having a tight grain with comfortable feel and good fullness are obtained in each case. The color of the leather does not change.

We claim:

1. A process for fat liquoring and greasing/softening a leather or fur skin, comprising treating leather or fur skin with an aqueous dispersion of at least one copolymer obtained by A) polymerizing
  a) 25 to 70% by weight maleic anhydride,
  b) 25 to 70% by weight $C_{12}$–$C_{30}$-alpha-olefins, esters of (meth)acrylic acid and $C_{12}$–$C_{30}$ alcohols, semiesters of maleic acid and $C_{12}$–$C_{30}$ alcohols, or mixtures thereof, and
  c) 0 to 10% by weight ethylenically unsaturated monomers copolymerizable with monomers a) and b) and different therefrom, with the proviso that the sum of monomers a), b) and c) is 100% by weight;

B) reacting said maleic anhydride prior to, during or after said polymerizing step with monovalent alcohols having at least one ether group therein, wherein the molar ratio of anhydride to alcohol is about 1:0.5 to 1:2, wherein the amount of hydrophilic units of said copolymer is greater than 50 wt %, and C) partially neutralizing or hydrolyzing acid or anhydride groups in said copolymer to form a dispersion having a copolymer content of at least 40 wt %.

2. The process of claim 1, wherein said molar ratio of anhydride to alcohol is about 1:0.7 to 1:1.5.

3. The process of claim 1, wherein the copolymer content of said dispersion is at least 50 wt %.

4. The process of claim 1, wherein said polymerizing step is bulk polymerizing.

5. The process of claim 1, wherein said maleic anhydride is reacted with an alcohol having formula I

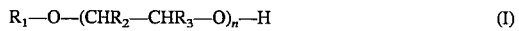

$$R_1\text{—O—}(CHR_2\text{—}CHR_3\text{—O})_n\text{—H} \qquad (I)$$

wherein $R_1$ is $C_1$–$C_6$-alkyl, $R_2$ and $R_3$ are hydrogen or $CH_3$, and n=1–10.

6. The process of claim 5, wherein n=1–4.

7. The process of claim 1, wherein said leather or fur skin has a shaved weight, and the weight percent of said copolymer relative to said shaved weight is 1–30 wt %.

8. The process of claim 7, wherein said weight % is 3–25 wt % of said copolymer.

9. The process of claim 7, wherein said weight % is 5–10 wt % of said copolymer.

10. The process of claim 1, wherein said leather or fur skin is treated at a float ratio of 50 to 1,000 wt %, a float pH value of 3.5–7 and a temperature of 20 to 60° C. for a period of time from 5–180 minutes.

11. The process of claim 10, wherein said float ratio is 80–500 wt %, said float pH value is 3.5–7, said temperature is 20°–60° C. and said time is 20–60 minutes.

12. The process of claim 1, wherein said leather or fur skin is further treated with a sulfated or sulfited oil or fat leather fat liquor.

13. An aqueous dispersion for treating leather or fur skins, comprising an aqueous dispersion of at least one copolymer obtained by A) polymerizing
  a) 25 to 70% by weight maleic anhydride,
  b) 25 to 70% by weight esters of (meth)acrylic acid, maleic acid or mixtures thereof with $C_{12}$–$C_{30}$ alcohols, and
  c) 0 to 10% by weight ethylenically unsaturated monomers copolymerizable with monomers a) and b) and different therefrom, with the proviso that the sum of monomers a), b) and c) is 100% by weight;

B) reacting said maleic anhydride prior to, during or after said polymerizing step with monovalent alcohols having at least one ether group therein, wherein the molar ratio of anhydride to alcohol is about 1:0.5 to 1:2, wherein the amount of hydrophilic units of said copolymer is greater than 50 wt %, and C) partially neutralizing or hydrolyzing acid or anhydride groups in said copolymer to form a dispersion having a copolymer content of at least 40 wt %.

* * * * *